Oct. 28, 1952　　　R. O. ELLERBY　　　2,616,014
WELD ANALYZER
Filed Feb. 26, 1948　　　　　　　　　　5 Sheets-Sheet 1
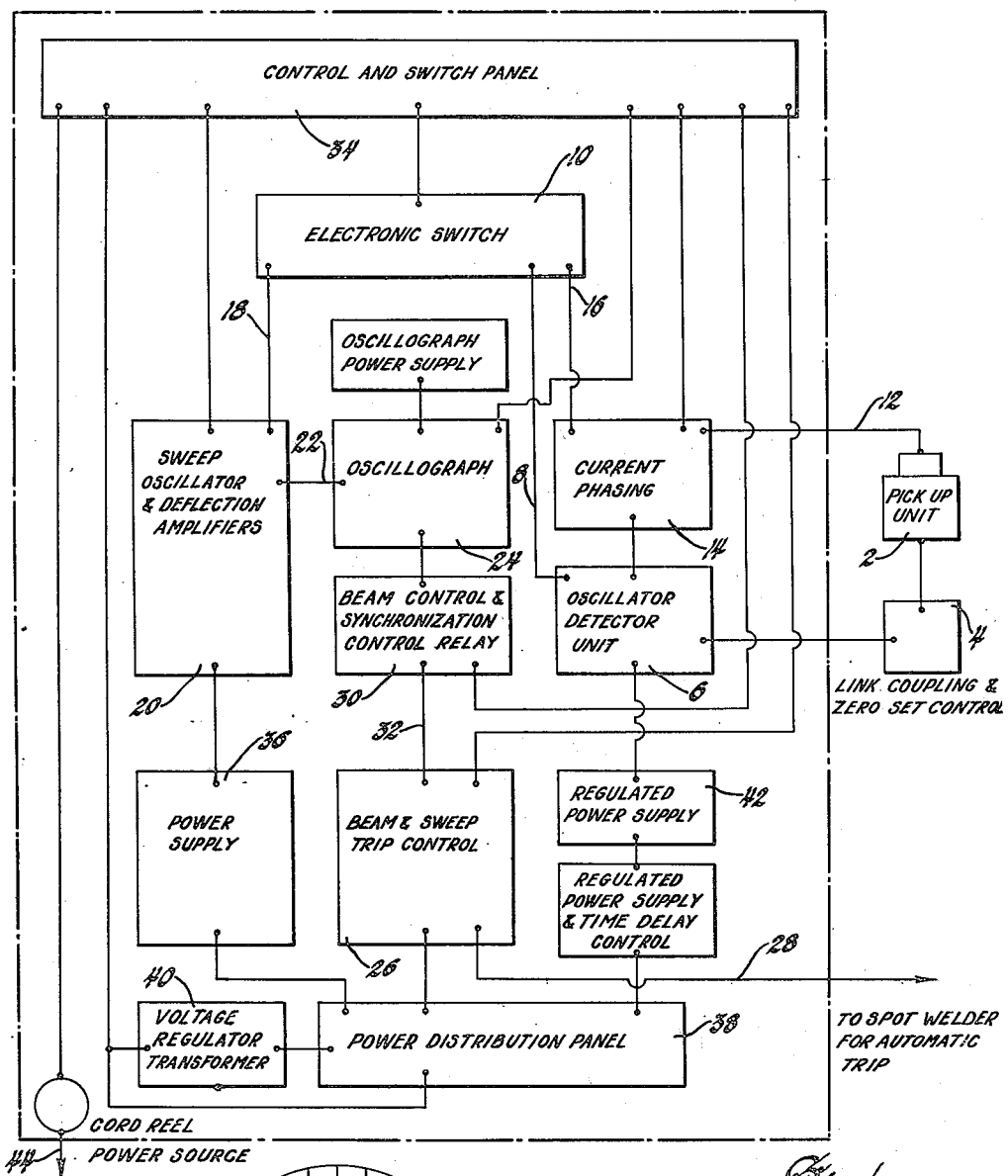
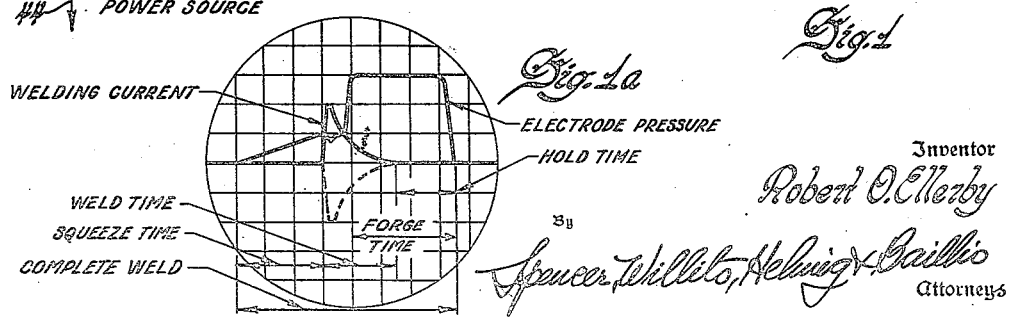
Inventor
Robert O. Ellerby
By
Spencer, Willito, Helmig & Baillio
Attorneys

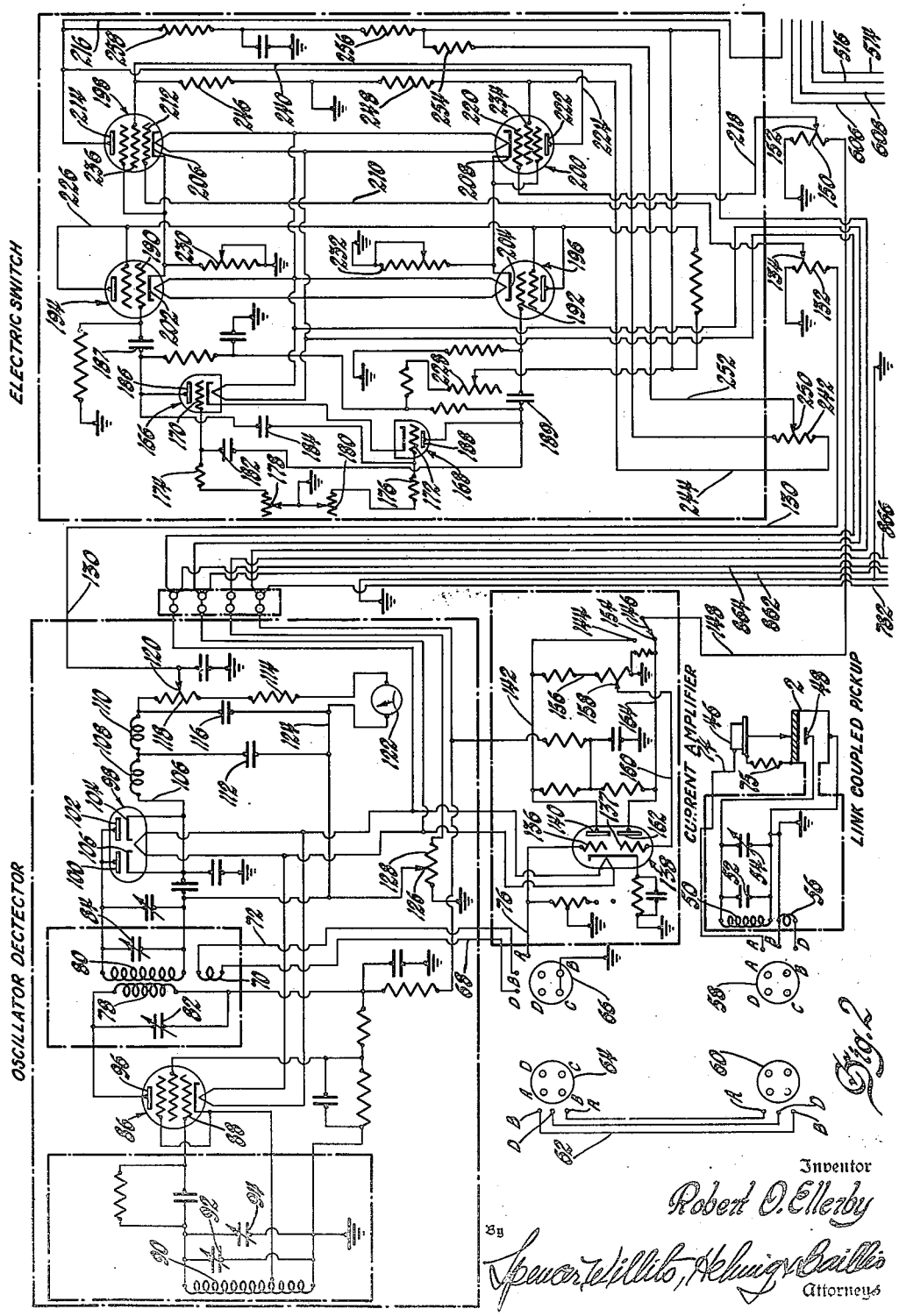

Oct. 28, 1952  R. O. ELLERBY  2,616,014
WELD ANALYZER
Filed Feb. 26, 1948  5 Sheets-Sheet 3

Inventor
Robert O. Ellerby
By Spencer, Willits, Helwig & Baillio
Attorneys

Oct. 28, 1952 R. O. ELLERBY 2,616,014
WELD ANALYZER
Filed Feb. 26, 1948 5 Sheets-Sheet 5

Inventor
Robert O. Ellerby
By
Spencer Willets, Helwig Baillio
Attorneys

Patented Oct. 28, 1952

2,616,014

UNITED STATES PATENT OFFICE 2,616,014

WELD ANALYZER

Robert O. Ellerby, Bloomfield Hills, Mich., assignor to General Motors Corporation, Detroit, Mich., a corporation of Delaware Application February 26, 1948, Serial No. 11,249

7 Claims. (Cl. 219—4)

This invention relates to measuring and indicating means and more particularly to means for measuring simultaneously several operating characteristics of a mechanism and indicating the same so that the operation thereof may be analyzed.

In producing satisfactory welds, the value of the welding current, the mechanical pressure applied and the timed relationship of the two are important. In order to study the actual values of each present in producing welds, there was devised a system such as that set forth in a patent issued November 4, 1947, to Frank L. Moncher, No. 2,430,237, entitled Weld Analyzer, and assigned to a common assignee. With this device it was possible to obtain curves representing actual timed values of the current and pressure as the weld was being made. This mechanism was of considerable size and somewhat arduous to adjust and operate.

It is, therefore, an object of my invention to provide an improved means to indicate welding current and pressure in an operating machine which is easily operable, adjustable and accessible for service.

It is a further object of my invention to provide means for analyzing welding current and pressure in which it is only necessary to locate a small pick-up unit at the welder being tested; the remainder of the equipment may be located some distance therefrom, without introducing error.

It is a still further object of my invention to provide an improved power supply to the pick-up and amplifier units, which regulates the voltage.

It is a still further object of my invention to provide novel means for moving one of the superimposed curves so that it will not lie over the other and they may be studied more easily.

It is a still further object of my invention to provide novel amplifying means for the signals prior to their introduction to the oscillograph.

It is a still further object of my invention to provide a novel initiating or trip control and synchronizing means to tie the indicator to the welding timer.

It is a still further object of my invention to provide a single trace or impulse or continuous trace at operator's selection.

With these and other objects in view which will become apparent as the specification proceeds, my invention will be best understood by reference to the following specification and claims and the illustrations in the accompanying drawings, in which:

Figure 1 is a block diagram showing the various essential parts of my invention.

Figure 1a is a view showing an example of the operating curves obtainable on the oscillograph.

Figure 2A:
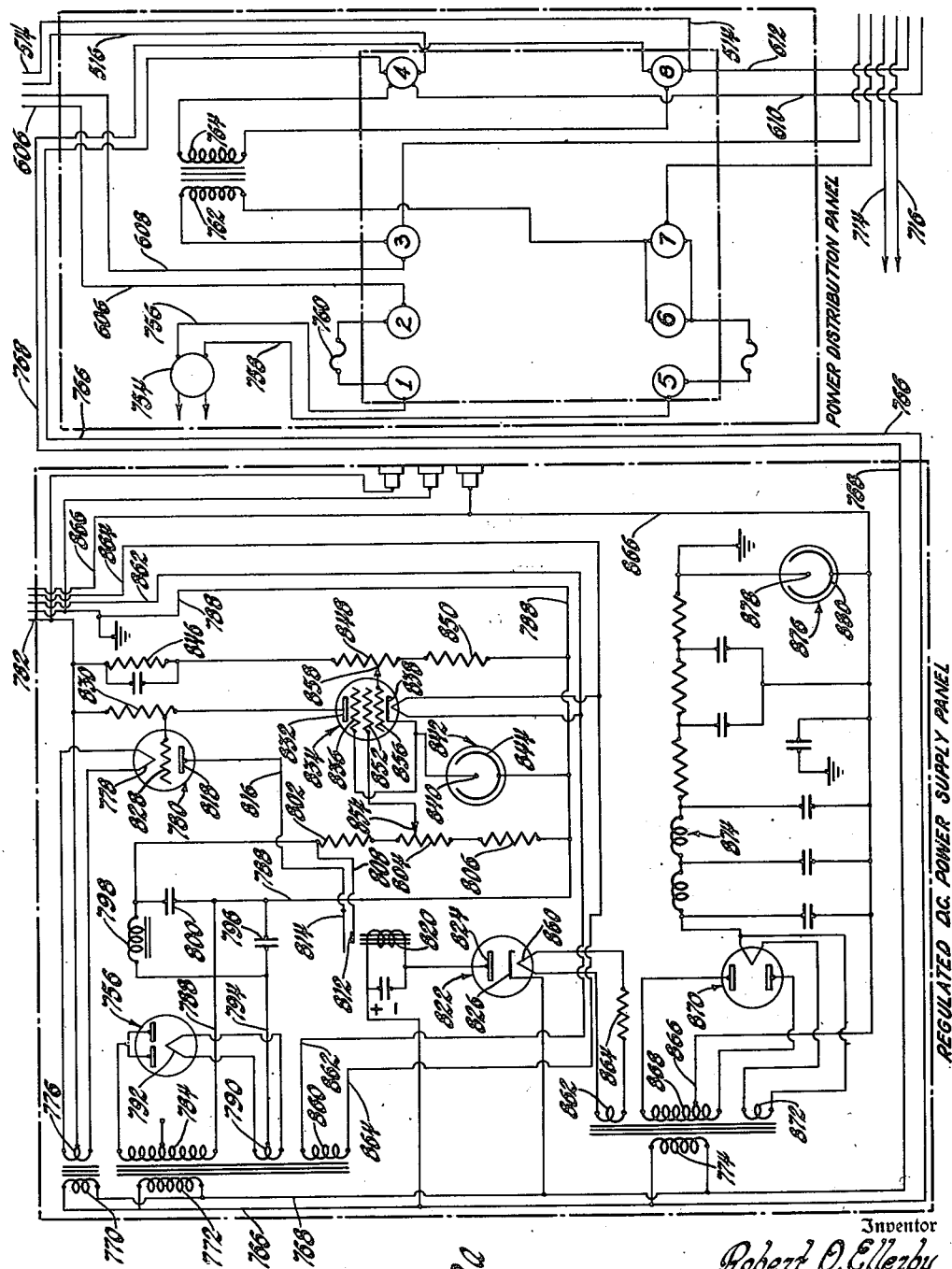

Figures 2, 2a, 3 and 3a taken together are the complete circuit diagram of the system of my weld analyzer.

As mentioned previously, the present invention deals in general with an improved system originally set forth in the above-mentioned Patent #2,430,237. The device may be simply described as consisting of one in which a pick-up unit is introduced between the electrodes of a welding machine so that it is subject both to the electrode pressure and current therethrough. The pick-up unit develops two signals, one proportional to the electrode pressure and the second proportional to the current, both of which are taken through separate channels, amplified and applied to an electronic switch which applies these signals alternately to the vertical deflection electrodes of a cathode ray tube. The frequency of application of these signals is so high that while the small impulses are proportional respectively to alternate signals, no break is seen in the continuous line and the curve showing the current appears transposed on that showing the pressure on the tube. In this manner the operator can determine exactly the relationship between the application of maximum pressure and the instant of maximum current.

This is the general operation of the system and the various units which applicant has incorporated to carry out the above functions are set forth generally in the block diagram in Figure 1. In that case there is disclosed a pick-up unit 2 which, as before mentioned, is capable of insertion between the welding electrodes. One of the signals generated by the pick-up unit is that proportional to the electrode pressure, and that signal is fed to a unit 4 for coupling to the oscillator-detector unit 6. In the previous instance the pick-up unit was made to be closely associated with the oscillator detector unit, inasmuch as the pick-up characteristic for this feature is a varying capacity and it was, therefore, necessary to more or less closely associate the two parts in order to avoid spurious signals effected by capacity changes between the pick-up and the oscillator detector. By using a low impedance link coupling circuit, it is no longer necessary to associate the pick-up unit physically near to the oscillator detector. This makes a much smaller unit which can be carried directly to the welder and simplifies the system. As a matter of fact, the pick-up unit 2 and the link coupling 4 are physically encased within the same housing.

The link coupled circuit applies the signal proportional to the pressure to the oscillator detector unit 6, which in turn is connected directly through line 8 with the electronic switch 10. The signal proportional to the current is conducted through line 12 to the current phasing means 14, where it is amplified and then applied through line 16 to the same electronic switch. The function of this electronic switch, as touched upon briefly above, is to very rapidly alternately apply signals proportional to the pressure and current so that both curves are generated simultaneously. The output, therefore, of the electronic switch is what might be termed a combined signal which is applied through line 18 to the deflection amplifiers in block 20. The output of these deflection amplifiers is applied directly through line 22 to the oscillograph 24 itself. In order to synchronize the operation of the present indicator and analyzing equipment or to cause the same to trip at a proper moment in the welding cycle, there is provided a trip control system 26 which is operated through cable 28 from the welding machine timer. This mechanism is connected to a beam control and synchronizing relay 30 through line 32, which actually operates the beam of the oscillograph. With the exception of a time delay circuit, the remainder of the block diagram consists of control panels and power supply means such as control panel 34, power supply 36 for the sweep oscillator, power distribution panel 38, voltage regulator transformer 40, and a regulating power supply 42, all of which are supplied in the main by supply line 44, connectable to a standard 110 v. A. C. source.

Referring now to the complete circuit diagram, which is disclosed in the combined Figures 2, 2a, 3 and 3a of the drawing, the pick-up member 2 is diagrammatically shown as consisting of an upper electrode 46 which moves in a vertical direction, as indicated by the arrow, relative to a lower electrode 48, the two comprising a capacity. The condenser so formed is part of a tuned resonant circuit which includes a coil or inductance 50 and two condensers 52 and 54. The condenser 54 is so adjusted as to bring the resonant circuit just off the peak of the resonance response curve when the pick-up has no pressure applied to its upper electrode 46. It is well known that on either side of the resonant peak there is a certain straight portion of the curve in which any change in the signal will be directly proportional to a capacity change or physical movement in this case. Thus, as the electrode 46 is forced down toward the electrode 48, the change in capacity will tend to further de-tune the resonant circuit and proportionately change the signal therefrom.

The inductance coil 50 is inductively coupled to a transfer coil 56 so that as the amount of energy flowing in the tuned circuit changes, the variation will be picked up by the coil 56 and transmitted to the oscillator detector. Coil 56 is connected directly to two terminals B and D of a connector plug 58. The mating portion 60 of the plug 58 has similarly identified terminals connected to a conductive cable 62, which terminates in one portion 64 of a second separable receptacle which applies these voltages to a plug 66. In this plug it will be seen that the terminals C—B are connected to ground, and D is connected to line 68, which extends to a small transfer coil 70, the opposite side of which is connected through line 72 to B, which is, of course, ground. Thus, any signal impressed upon the transfer coil 56 in the pick-up assembly is transferred through a low impedance circuit to the transfer coil 70. This signal is proportional to any change in the pressure on the welding electrodes.

At the same time a voltage proportional to the flow of current through the welding electrodes is developed across the shunt resistance 75 in the upper electrode 46, and this is shown as being conducted through line 74 to terminal A. Following the same channels as before, this current flows through terminal A in each of the disconnect plugs, and is applied to line 76 from the upper plug 66. Thus we have developed a signal proportional to the welding pressure, and also a signal proportional to the welding current and transferred each of these to a portion of the remote apparatus. Since the line between the transfer coils 56 and 70 is of low impedance, it can be relatively long without introducing any appreciable error into the system.

The coil 70, to which the signal proportional to the pressure changes is applied, is in close inductive relation to transformer coil 80, which forms a portion of the coupling between an oscillator and a detector. Associated with each of the coils 78 and 80 is an adjustable condenser 82 and 84 respectively. These tuned circuits are also so adjusted as to peak at the same resonant frequency as that of the pick-up circuit so that substantial energy will be transferred. Tube 86 is the oscillator tube and connected to its control grid 88 is a resonant circuit consisting of inductance 90 and condensers 92 and 94 which determine the frequency thereof. The plate 96 of the oscillator is connected directly to the resonant circuit including capacity 82 and inductance 78, which transfers energy to the input circuit of the detector tube 98, which, of course, is affected by the variation in the signal on the coil 70. This input circuit from resonant circuit 84, 80 is connected to two diode terminals 100 and 102.

The output of the detector is from the terminals 104 and 106, which are both connected to line 106. The signal developed thereon passes through a low pass filter comprising inductances 108 and 110 and capacities 112 and 116. The signal then proceeds into a resistance 118 having a variable tap 120 which can be adjusted as desired. Resistor 118 is connected directly to a second resistor 114, which in turn is connected through an indicating meter 122 having its other terminal connected through line 124 to adjustable tap 126 on resistance 128. Thus the meter 122 will indicate to the operator the amount of energy flow. The movement of the tap 120 on the resistor 118 adjusts the value of the signal developed in the oscillator detector, which is to be applied to the electronic switch and in turn to the cathode ray tube. This signal is applied through line 130, which terminates in a resistor 132, the opposite end of which is grounded and which is provided with an adjustable tap 134 to vary the value of the applied signal.

The signal, which is proportional to the current flow through the welding electrodes, is applied to line 76, which terminates in one of the control grids 136 of the tube 138. Thus, the potential developed across the resistor 75 is applied directly to this control electrode. This tube acts as a triode amplifier. The tube 138 is a double triode tube and the first triode section includes a plate 140. Plate 140 is connected through line 142 to a stationary switch tap 144 which cooperates with a movable switch arm 146 in turn connected through line 148 to a resistor 150, the opposite terminal of which is connected to ground. A variable tap 152 is associated with the resistor 150 and is used to control the output to the electronic switch. Therefore, the amount of the signal amplified through one section of the tube 138 may be applied directly to the electronic switch through the resistor 150 and this signal is proportional to the current flow through the weld.

As will be seen, however, from a brief study of Figure 1a, the two curves, one representing the weld current and the other representing electrode pressure, appear simultaneously and in superimposed position on the screen of the cathode ray tube. That section in which the electrode pressure is being built up and at which time the weld current is impressed and then slowly dies away is, of course, the most important part of the cycle and in many instances this superimposed position of the curves is somewhat confusing, and for careful study it would be desirable to separate the two. This is accomplished by a 180° phase reversal of the signal proportional to the current, which would then lie in the position shown in dotted lines on Figure 1a. This reversal is accomplished through the same portion of the circuit just discussed, and is executed by moving movable switch arm 146 from stationary contact 144 to stationary contact 154, or that position in which it is now shown in the drawings. The signal then, which appears in line 142, develops a voltage across a potentiometer 156 having an adjustable tap 158, which tap is connected back through conductive line 160 to the control electrode 137 in the second triode section of the tube. The proportional amplified signal then is picked up from plate 162 and applied to line 164, and if the switching is so adjusted, appears in line 148 for application to the electronic switch, and, as before mentioned, is 180° out of phase with the signal previously applied through stationary contact 144, so that the trace is inverted and both may be read more accurately.

It will be evident that at this point I have specifically described the apparatus utilized for picking up and applying to two different potentiometers, signals proportional, first to the weld electrode pressure, and, second, to the welding current flowing. As described generally, the next portion of the equipment is termed the electronic switch, and its purpose is to take the two signals generated and to alternately apply them at such rapid frequency that no pause between impulses can be detected; that is, a signal proportional to the value of the pressure is applied for an ultra-short time interval, immediately followed by a signal proportional to the current and these are alternated at a frequency in this case of somewhere around 1500 cycles. The electronic switch, specifically, consists of what may be termed an oscillator or multi-vibrator which operates at the frequency desired. This consists of two triode tubes 166 and 168, connected in inverted relation. The grids 170 and 172 are connected to resistances 174 and 176, which are fixed, and also 178 and 180, which are simultaneously adjustable, which resistances in combination with capacities 182 and 184 control the frequency of this multi-vibrator circuit. The impulses generated at the frequency of the multi-vibrator are applied alternately through plates 186 and 188, condensers 187 and 189, to the control grids 190 and 192 of tubes 194 and 196 respectively. These tubes, while they are pentodes, have their plates and grids connected together, and so operate as triode amplifiers, and are used as blocking tubes to alternately block the signals out. They cooperate with two switching amplifier tubes 198 and 200, which are the actual switching means for the impressed signals previously indicated.

The cathodes 202 and 204 of the tubes 194 and 196 are connected respectively to the cathodes 206 and 208 of the tubes 198 and 200. Therefore, when one of the tubes, for example 194, is blocked out by a high negative voltage from the multi-vibrator, then the connected switching amplifier tube acts as a normal amplifier, but when the associated blocking tube conducts or passes current, then the cathode voltage is sufficiently high to prevent the flow of current or block out the associated amplifier tube. These, the tubes 194 and 196, are alternately conducting and non-conducting at the frequency of the multi-vibrator and in turn cause amplifier tubes 198 and 200 to alternately conduct at the same frequency. If now we impress on the control grids of the amplifier tubes 198 and 200 separately, the proportional signals appearing on potentiometers 132 and 150, then we will obtain high frequency impulses proportional to our original signals.

Adjustable tap 134, therefore, is connected to a conductive line 210, which extends to control grid 212 of the amplifier tube 198. The plate 214 of this tube is connected to output line 216, which extends to the vertical deflection amplifier. This, therefore, now extends a signal to the vertical deflection amplifiers, which is proportional to the electrode pressure. In like manner the signal appearing across the potentiometer 159 is applied through line 218 to the control grid 220 of tube 200 and the signal thereon is amplified by this tube and applied to plate 222, which is connected through line 224, which extends to the previously described line 216. Thus both signals now appear in the same conductive line but at different values at different instances. Thus, for example, a series of impulses will be impressed on line 216 from amplifier tube 198, which are proportional to the electrode pressure, and a second series of intervening impulses are impressed upon line 216 which are proportional to the welding current during the time that the other impulses are blocked out. The resultant current is, therefore, alternately proportional to welding electrode pressure and current, varying from one to the other at the frequency of the multi-vibrator.

The operation of the blocking tubes 194 and 196 may be varied or controlled, since their grids and plates are connected through line 226 to a potentiometer 228, wherein the potential appearing thereon may be varied. A second adjustment in the cathode circuits of these tubes is provided which consists of adjustable bias resistors 230 and 232, which control the cathode potential of tubes 194 and 196 and may be altered as the tube characteristics change or age. They also permit very precise adjustment of the amplifier tubes 198 and 200. Lastly, a balance control is provided which enables the operator to superimpose the wave forms proportionate to the signals or to separate the same. This balance control is through screen grid 234 of tube 200 and screen grid 236 of tube 198. Grid 236 is connected through line 240 to one side of a resistor 242, the opposite side of which is connected through line 244 to control grid 234. The grids are interconnected through two series resistors 246 and 248 which have their intermediate point connected to ground. An adjustable tap 250 is associated with resistor 242 and is connected by line 252 to resistor 254 and thence through resistor 256 and resistor 258 to line 216.

The output of the electronic switch, therefore, is applied through line 216, which is connected to a relatively large coupling condenser 260 and thence to the vertical deflection amplifier. The size of the condenser is necessary due to the fact that it becomes charged to a voltage equal to the average of the two output voltages of the electronic switch. This results in a displacement of the two patterns on the cathode ray screen, causing the patterns to center about the zero line, determined by the vertical position circuits. The time constant of a large condenser is long enough, however, so that the entire welding cycle may occur before any drift of the two patterns becomes perceptible. The picture on the cathode ray screen appears as shown in Figure 1a and the two do not drift together.

In order of course, to control the oscillograph, means must be provided to horizontally sweep a beam across the oscillograph in a certain timed relation, depending upon the circumstances of the signals. The other impressed signals giving a vertical deflection for a certain time period, will then, in combination with the horizontal sweep, draw out the graph of the characteristic being studied. I, therefore, provide a saw-tooth sweep oscillator which in this instance comprises the gas tube 262, which is connected in parallel with the first triode section of the duo-triode 264, the plate 266 of the first being connected to plate 268 of the second through resistor 270. A series of condensers 272 are connected in parallel from this connecting line to a plurality of stationary taps which are engaged by a variable position switch member 274, in turn connected through line 276 to ground. By varying the position of the switch contact 274, we may change the sweep frequency of the device. The cathode 278 of tube 264 is maintained at positive potential by means of the voltage divider consisting of resistances 280 and 282.

The control grid 284 of the gas tube 262 is connected to a divided resistance 286, 286', and thence through line 288 to the stationary contact 290 of a magnetic switch operated by relay coil 292, the movable contact 294 of which is grounded. This switch is a beam control and synchronizing means. A condenser 296 is connected across portion 286' of the tapped resistor, and likewise connected through the conductor 297 from the tap to a movable switch contact 298, engaging either stationary contact 300 or 302, these two contacts being taps on a main resistor 304 connected between ground and line 306.

The operator may desire to operate the analyzer with a single impulse or sweep as for a single weld cycle or he may desire to continuously sweep the screen and observe how the graph changes over a period of cycles. Therefore, means for switching from continuously repetitive sweeps to a single sweep until further energization has been provided. Switch 298 fills this function and when it is its uppermost position or engages contact 300 the sweep circuit will be actuated continuously and when switch 298 is moved to the lower contact 302 only a single sweep for each energization of the trip circuit is provided. This continuous sweep action is provided by so proportioning the applied voltages that the grid voltage on 284 is adjusted so that the firing potential of the tube 262 is slightly below the potential of the cathode 278 of diode 278—268. The diode therefore does not conduct and a recurrent sweep is developed as charges are built up and dissipated on condenser 272.

If, however, the switch 298 is moved to engage contact 302, then a higher negative voltage is applied to grid 284 to increase the firing potential thereof. This carries that potential above that required by the diode 278—286. A point is then reached before the gas tube 262 may fire at which the plate resistance of the diode and resistors 280, 282 form a potential divider maintaining a voltage across the timing condenser 272 at a fixed value just below the firing potential of the tube and it cannot alone build up further. In order to produce a single timed sweep a positive pulse must be provided for the grid 284 to cause it to fire. Operation of the beam control relay coil 292, which closes switch 290—294 and grounds line 288, provides this pulse. Thus, every time that the relay is energized, the beam will sweep once as condenser 272 charges. The values of condenser 296 and resistance 286' are so selected to give a time constant so that only one sweep will be triggered no matter how long the contacts 290—294 remain closed. When the contacts open, condenser 296 discharges through resistance 286', which is intentionally made very large so that any possible contact bounce will not trip the gas tube until the condenser is fully discharged and the circuit returned to normal. The output from the sweep oscillator and control diode is fed from plate 268 through line 307 to grid 308 in the second section of the tube 264, which is a cathode-follower amplifier for the signal which then appears across the plate 310 and the cathode 312.

Plate 310 is connected to one end of a resistor 314, the opposite end of which terminates in line 316, which extends to the D. C. power supply panel. The cathode 312 is connected directly to resistance 318 and thence through resistance 320 in series therewith to line 306. An adjustable tap 322 is movable over resistor 318 and is connected through resistance 324 to ground. In like manner adjustable tap 326 slides on resistor 324 and is directly connected to control grid 328 of tube 330, which with tube 332 forms an amplifier which may be termed the horizontal deflection amplifier, as it amplifies the signal providing the horizontal deflection of the beam or the sweep. By moving tap 322 over resistance 318 horizontal balance of the sweep is obtained and by adjusting tap 326 on 324 the horizontal signal gain may be adjusted. Both of these adjustments are made inside the apparatus and not on the control panel.

The output of the push-pull amplifier 330—332 is directly connected to the horizontal deflection plates of the cathode ray tube by having their plates 334 and 336 connected to lines 338 and 340, condensers 342 and 344 and lines 346 and 348 to the cathode ray plates 350 and 352 respectively. The outputs of the two tubes are opposite in phase. A plurality of resistors 354, 356, 358 and 360 are connected in series across lines 338 and 340 and a second group 362, 364, 366 and 368 are also connected across the same lines in parallel with the first group. Conductive line 370 connects line 316 with a point between resistances 356 and 358 and line 372 connects line 306 with a similar point between resistances 364 and 366. An adjustable tap 374 on resistance 362 is connected directly to line 346 and a similar adjustable tap 376 on resistance 368 to line 348. The potential divider network consisting of 362, 364, 366 and 368 which has just been described is provided so that it may be adjusted to give an output voltage on the horizontal amplifier of ground potential when there is no signal input.

The next portion of the system to be described is that which provides position control for the horizontal beam. This comprises that portion of the circuit between line 306 and the control electrode or grid 378 of tube 332. A plurality of resistances 380, 382, and 384 are connected in series between lines 316 and 306. An adjustable tap 386 is provided on resistance 382, which tap is directly connected to grid 378. Resistances 388 and 390 are connected from intermediate points between resistances 380—382 and 382—384 respectively and to ground. A shunt condenser 392 is connected across resistance 388 and a similar shunt condenser 394 across resistance 390. By moving the adjustable tap 386 over resistance 382, the horizontal beam may be adjusted. Since the deflection amplifier is direct coupled to the deflection plates, a variation in the D. C. voltage applied to the grid 378 will cause the pattern to shift to the right or left depending on the direction of movement of the control.

The remainder of the unit 20, as shown on Figure 1, is that portion devoted to amplifying the vertical deflecting signals that are provided by the electronic switch unit 10. The vertical deflection amplifiers are substantially the same as the horizontal deflection amplifiers and consist of two tubes 396, 398, connected in push-pull relation. The incoming signal from the electronic switch is applied to condenser 250, which is connected to a stationary terminal 400. Movable switch arm 402 of a multi-blade, multi-position switch is adapted to engage this contact in one of its positions as well as contacts 404 and 406 when in other positions. The movable switch arm 402 is connected through resistor 408 to ground. A variable tap 410 on resistor 408 is connected in turn to the control grid 412 of the tube 396 and provides a vertical amplifier gain control. The plate 414 of this tube is connected through line 416 with one side of a potential divider similar to that in the horizontal deflection amplifier output which consists of four resistances 418, 420, 422 and 424 in series, the opposite end being connected to line 426, which extends to plate 428 of tube 398. In parallel with these resistances and between the two lines 416 and 426 is another group of resistances in series relation, 430, 432, 434, and 436 with a line 438 connecting a point between resistors 432 and 434 to line 316. Line 316, it will be remembered, is one of the D. C. power lines. Cathode 440 of tube 396 is connected through resistor 442 to line 306. The center tap between resistors 420 and 422 is connected to line 306 by line 444. The output of this amplifier is taken from two adjustable taps 446 and 448 movable over the resistors 418 and 424 respectively. Tap 446 is connected by line 450 to stationary switch contacts 452 and 454, both of which are engaged in different positions by the movable switch arm 456, which also may be moved to engage a stationary contact 458 and moves in unison with movable arm 402. Tap 448 in like manner is connected by line 460 to stationary contacts 462 and 464, which are engaged by movable switch arm 466, which completes the three gang switch assembly. Arm 466 also engages contact 468 in one remote position.

Condenser 470 is connected across between line 450 and line 416 and condenser 472 from line 460 to 426.

Gang switch arm 456 is connected through line 474 to one of the vertical deflection plates 476 and switch arm 466 is connected through line 478 to the other vertical deflection plate 480 so that if these arms rest on either of their first two contacts the output of the amplifier is directly impressed upon the vertical deflection plates. As in the previous amplifier the output voltage is balanced at ground potential with no signal present by adjusting the taps 446 and 448. The vertical positioning control is a substantial duplicate of the horizontal positioning control and consists of three resistances 482, 484 and 486 in series between lines 306 and 316. A resistor 488 is connected from a point intermediate, resistances 482 and 484 to ground, and a resistor 490 from a point between resistances 484 and 486 to ground. An adjustable tap 492 movable over resistor 484 is connected directly to grid 494 of tube 398 and by moving the same thereover the potential on the grid is varied and the position of the trace varied.

The three gang switch 402, 456 and 466 may be termed the vertical input selection switch and in the position shown which may be designated as position #1, the signal from the electronic switch is applied to the vertical deflection amplifiers 396, 398 through switch arms 400, 402 and the output of the amplifiers applied through switches 456, 452 and 466, 462 to the vertical deflection plates 476, 480 of the cathode ray tube 512. Instead of applying the signal from the electronic switch the operator may wish to use the cathode ray tube to indicate some external signal and there is supplied means for connecting in such signal. Two connector plugs 496 and 498 are mounted in the casing and each has one terminal grounded. Terminal 500 of plug 496 is connected by line 502 to contact 404 of switch 402 and terminal 504 of plug 498 is connected to line 506 through resistor 508 to ground. Resistor 508 has an adjustable tap 510 which extends to contact 458 of switch 456. Contacts 452 and 454 of switch 456 are interconnected as are contacts 462 and 464 of switch 466. With the gang switch 402, 456, 466 in the first position the signal from the electronic switch is applied to the vertical deflection amplifier and the output of the amplifier applied to the vertical plates 476, 480 of the cathode ray tube as previously described. In the second position with the three switch arms engaging contacts 404, 454 and 464 respectively, the signal from the electronic switch is cut off and any external signal applied to plug 496 is connected to the amplifier input, the output of which as before is applied to the vertical plates as there has been no change in the switching of the two arms 456 and 466. Thus, the externally generated signal is amplified and applied to the cathode ray tube. If, on the other hand, it is not desired to amplify this external signal, then by plugging into connector 498 and moving the switch to the third position, the signal will be applied to the deflector plates directly without passing through the amplifier through an obvious circuit and the strength of the signal may be varied by moving tap 510 over resistor 508.

Figure 3:
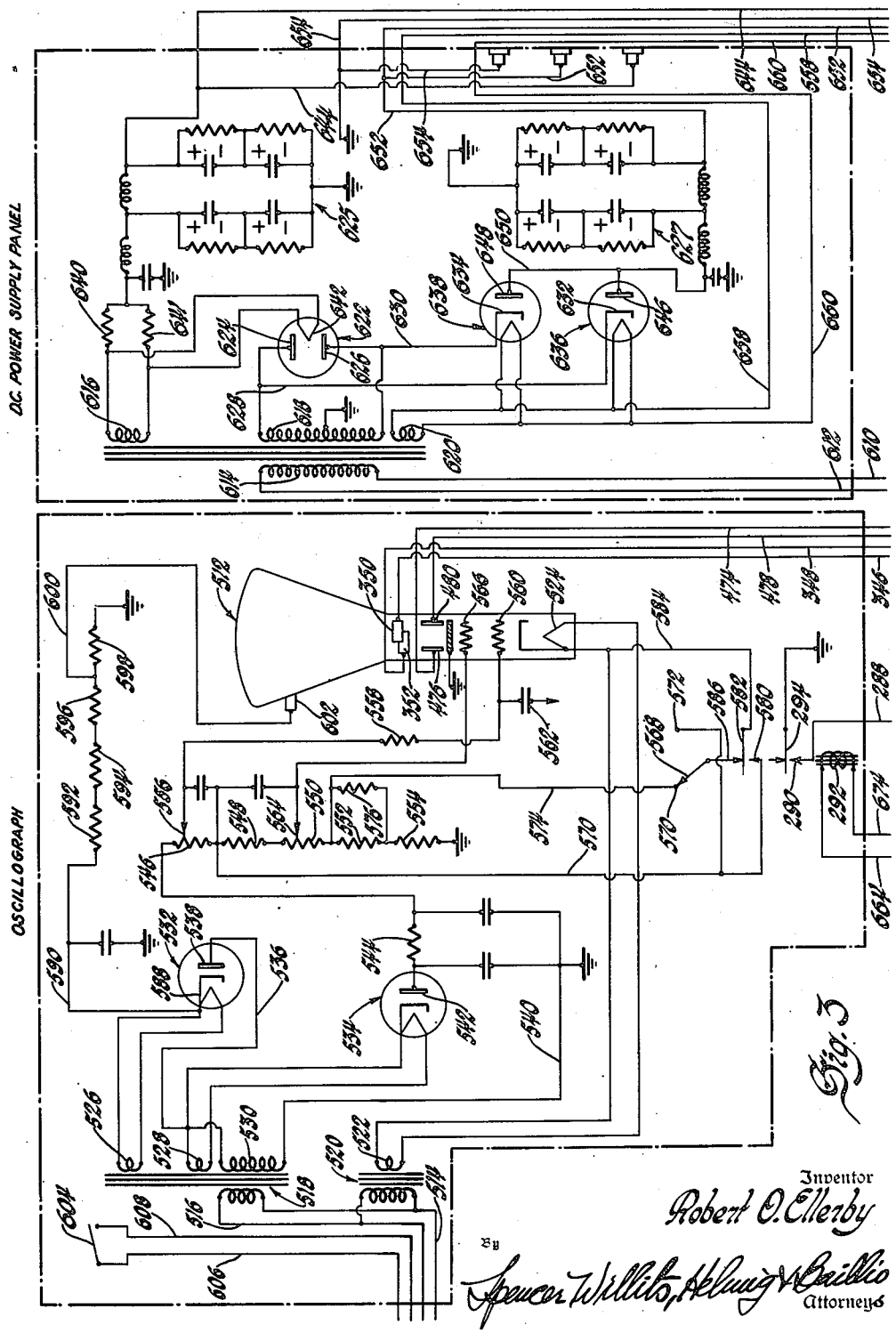

The oscillograph itself is indicated on the block diagram as 24 and is shown within the dash-dot line enclosure in the left hand portion of Figure 3. Incoming lines 514 and 516 bring in power at 110 v. from the panel and are connected to the primary coils of two transformers 518 and 520. The secondary 522 of transformer 520 is connected directly to the heater 524 of the cathode-ray tube. Transformer 518 on the other hand has a plurality of secondary coils 526, 528 and 530. Coils 526 and 528 are directly connected to the heater elements of half wave rectifier tubes 532 and 534 respectively. Line 536 connects one end of secondary 530 with electrode 538 of the tube 532. The opposite terminal of the secondary 530 is connected to ground through line 540. Electrode 542 of the tube 534 is connected through resistor 544 with one end of a potential divider formed of a plurality of resistors 546, 548, 550, 552, and 554, all in series to ground.

An adjustable tap 556, adapted to move over the resistor 546, is connected through resistor 558 to control grid 560 of the tube for controlling the intensity of the same. Condenser 562 is shown connected to this same grid; the line extending therefrom terminates in an arrow indicating further connection, which in this case would be to a beam blanking amplifier (not shown) if it was desired to use one. An adjustable tap 564 cooperating with resistor 550 is directly connected to a second control grid 566 of the cathode ray tube. This grid is provided to control the focus of the tube and the same is therefore adjusted by moving the tap 564.

A switch 568 engaging two stationary contacts 570 and 572 is provided to control the energization of the beam. Contact 570 is connected by line 574 to a point intermediate resistors 550 and 552 and resistor 576 is connected from this line in shunt with resistor 552 and connected to a point between resistors 552 and 554. Line 578 extends from a point between resistor 546 and 548 to stationary contact 580 and also to stationary contact 580 and also to stationary contact 572. Contact 580 is one associated with the relay switch 292 and cooperates with movable arm 582 actuated by the coil, said arm being connected through line 584 to the tube cathode 524. When in its deenergized position arm 582 is adapted to engage contact 586, which is directly connected to the switch arm 568. When switch 568 is moved to the position as shown and is in engagement with contact 570, it is in what may be termed automatic position. This means that the switch shorts out a section of the bleeder which increases the negative voltage applied to grid 560 and stops the electron beam. When in this condition, if the relay 292 is energized, then switch 580—582 is closed to alter this condition and the beam is turned on for the duration of the welding cycle or as long as relay 292 is energized and as soon as 292 is deenergized the beam is again cut off. In other words, it is only on during energized intervals of relay operation and is otherwise cut off. If, on the other hand, the switch 568 is moved to contact 572, then the beam is in what may be termed manual position and the beam is on continuously. This portion of the oscillograph system from electrode 542 is all at negative or below ground potential.

From electrode 588 of rectifier tube 532 the positive potential is derived and this is fed through line 590 to a bleeder formed of resistances 592, 594, 596 and 598, the opposite end of the series being connected to ground. A line 600 is connected at an intermediate point in the bleeder and this line extends to the intensifier electrode 602 of the cathode ray tube 512. A main power switch 604 for the whole system is shown in this panel and connected to lines 606 and 608 which will be more specifically described at a later point.

Certain direct current voltages are required by the apparatus and these are provided by the D. C. power supply panel shown to the right of the oscillograph. A pair of input lines 610 and 612 extend from the power distribution panel and are connected across primary 614 of the power transformer. A plurality of secondary coils 616, 618 and 620 are located in inductive relation to the primary. A full wave rectifier tube 622 has its electrodes 624 and 626 connected across the main secondary coil 618, which is also connected by lines 628 and 630 to cathodes 632 and 634 of two half wave rectifier tubes 636 and 638. Secondary 616 is connected to two resistors 640 and 641 and to the heater electrode 642 of the full wave rectifier 622. The center point of the two resistances is connected through a series of chokes and resistance capacity members forming filters 625 to one of the power supply cables 644 which carries a potential above ground, in this particular case approximately +375 volts. The other two half wave rectifiers that have an electrode connected to the secondary 618 have their plates 646 and 648 connected to a common wire 650 which in like manner is connected through a similar series of chokes, capacities and resistances comprising filter circuits 627 to the negative power lead 652 which is in this example −300 volts. Secondary 620 provides heater energy for the two tubes 636 and 638 and also to lines 658 and 660 which extend to other cathode heaters. The intermediate cable lead 654 is grounded.

Figure 3A:
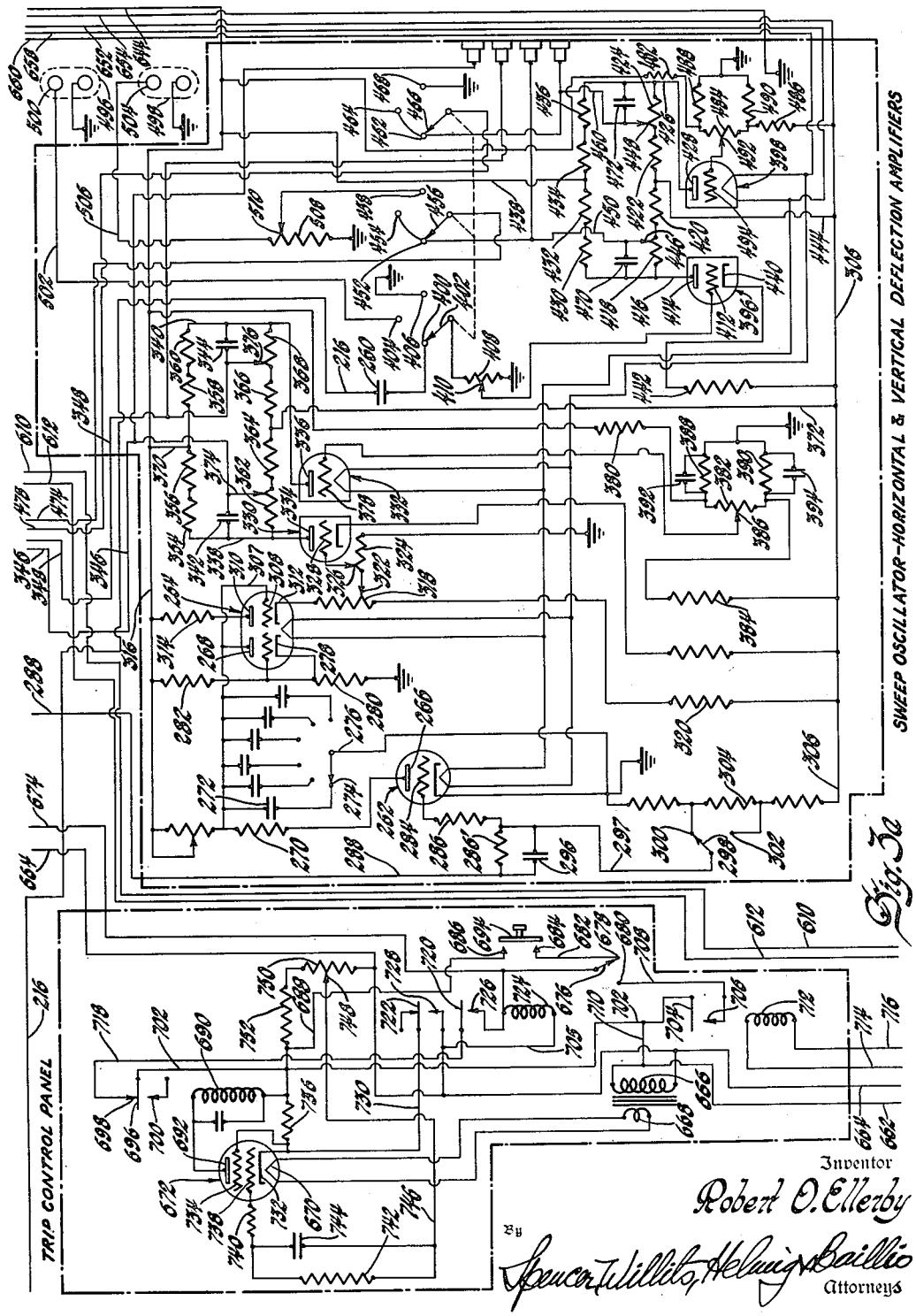

As mentioned at an earlier point in the specification, it is desirable to have the weld timer control provide the initiating pulse for the apparatus and this is accomplished through the beam control and synchronizing relay 292, which is operated by the equipment in the trip control panel shown to the left in Figure 3a. Two power lines 662 and 664 extend from the power distribution panel and are connected across the primary 666 of a transformer. The secondary 668 provides current for the heater element 670 of the thyratron tube 672. Line 664 extends to the relay coil 292 and a return line 674 is connected to the movable switch arm 676, which cooperates with two fixed contacts 678 and 680, the first being the manual position and the second the automatic. The manual contact is connected by line 682 to a stationary contact 684 and a second spaced stationary contact 686 by line 688 to relay coil 690 and thence to plate 692 of tube 672. A push button switch 694 bridges the gap between contacts 684 and 686.

Relay coil 690 actuates movable relay contact 696, which moves between stationary contacts 698 and 700. The movable contact 696 is connected by line 702 to movable switch arm 704 which in turn cooperates with stationary contact 706 connected by line 708 to contact 680. Line 702 is connected to power line 662 by tie line 710. Switch arm 704 is operated by relay coil 712, which is connected back to the welding machine timing circuit by two lines 714 and 716. Contact 698 of relay switch 690 is connected by line 718 to one movable switch arm 720 of a relay switch, which with a second movable switch arm 722 is moved by relay coil 724. Movable switch arm 720 cooperates with stationary contact 726, which is connected both to one terminal of the relay coil 724 and to line 674. The other terminal of the relay coil is connected to line 664 and to stationary contact 728 cooperating with movable switch arm 722. Movable switch arm 722 is connected by line 730 with both the cathode 732 and grid 734 of the tube 672. Resistor 736 is connected between the grid 734 and the relay coil 690. The control grid 738 is connected through resistance 740 to resistance 742 and condenser 744 in parallel and through line 746 to an adjustable tap 748 on resistor 750. Resistor 750 is connected in series with resistor 752 across lines 664 and 688.

Assuming first that the switch 676 is in the manual position or that shown on the drawings and engages contact 678 then when the manual push button 694 is depressed a circuit is completed for relay 724 as follows: line 662, line 710, line 702, line 688, switch 686, 694, 684, line 682, switch 678, 676, relay coil 724, line 705, back to power line 664. When relay coil 724 is thus energized, it locks in through its own switch contacts 720—726, and through normally closed contacts 696—698 of relay 699. The coil 292 of the beam synchronizing relay is connected in parallel with relay 724 so the beam is now turned on and a single sweep initiated.

Simultaneously with closing switch 720—726 the relay coil 724 causes switch 722—728 to close, which connects the cathode 732 directly to main line 664 and then applies full line current to the anode cathode circuit of the tube. Since, however, the grid 738 is held at negative potential due to the charge which has accumulated on condenser 744, no current will flow in the anode cathode circuit. When sufficient time has elapsed following the relay energization to permit the charge on 744 to leak off through resistance 742 so that the grid loses control, current will flow in the anode-cathode circuit of the tube 672, and relay coil 690 will be energized. This opens switch 696—698, which, as before mentioned, is in the holding circuit for relay coil 724. The two relays drop out since the deenergization of coil 724 breaks switch 722—728 or power switch for the tube which stops the electron beam of the cathode ray tube, resets the sweep oscillator for the next sweep, and charges up condenser 744 ready for another actuation. The length of the timing action of condenser 744 may be adjusted by moving the adjustable tap 748 over the associated resistor 750, moving the same upward to shorten and downward to lengthen the time period.

If instead of manual operation of the device it is desired to trigger the same by the welding timer, then switch 676 is moved to contact 680. This replaces the manual push button switch 694 with relay operated switch 704—706. Then at every energization of the coil 712 from the welding timer the cycle, as described above, will be carried out to synchronize the same with the operation of the welding machine.

A power distribution panel 38 is provided to supply all the power for the complete device except the tripping or synchronizing pulse that comes from the weld timer through lines 714, 716. As shown on Figure 2a, a cord reel 754 is provided for an attachment cord to be connected to the conventional 110 v. A. C. current. Two power lines 756 and 758 are connected to the cord reel and extend to posts #1 and #5 on the panel. A fuse 760 is connected between posts #1 and #2 and post #2 is connected to line 606 connected to main switch 694. Line 608 extends back to binding post #3. Binding post #5 is connected through a fuse to binding post #6, which is in turn connected by a bus bar to binding post #7. The primary 762 of a voltage regulating transformer is connected across binding posts #3 and #7. The secondary 764 of the transformer is connected across binding posts #4 and #8. Connected to binding posts #4 and #8 are lines 766 and 768 which extend to the regulated D. C. power supply panel and lines 514 and 516, which extend from the oscillograph assembly and lines 610 and 612 from the D. C. power supply panel.

It will be obvious from the above that ordinary line voltage is applied to the panel, regulated to a certain extent by the transformer 762—764, and supplied in general to the apparatus. However, for the oscillator-detector unit, the current amplifier and phase selector and the electronic switch, it has been found advisable to further regulate the supply voltage to further stabilize the voltage. For this purpose the regulated D. C. power supply panel 42 is provided and the supply lines 766 and 768 from the power distribution panel are connected to three transformer primaries 770, 772 and 774. The circuit of this panel may be divided into two parts, one for supplying the regulated positive voltage (that above ground potential) and a second part that supplies negative voltage (that below ground potential). In the drawings the upper half of the circuit is utilized for the positive potential and the lower half for the negative, as outlined by the dash-dot line.

Referring first to the positive voltage supply portion, the secondary coil 776, associated with primary 770, is connected directly to the cathode 778 of a triode tube 780. A center tap on this secondary is connected to line 782, which is the main positive line and extends to the other sections of the apparatus. Secondary 784, associated with primary 772, has one terminal connected to the electrodes of a rectifier tube 786, the opposite terminal being connected through line 788 to ground. Secondary 790, also associated with primary 772, feeds cathode 792 of tube 786 and has a center tap connected to line 794, which extends to a capacitor 796, the other side of which joins line 788. Line 794 is also connected to choke coil 798. Condenser 800 is connected between line 788 and the opposite end of the choke coil and a plurality of resistors 802, 804 and 806 are connected in parallel with said condenser. Line 808 extends from a point intermediate the choke 798 and resistance 802 to stationary switch contact 812, which cooperates with movable switch arm 814 connected through line 816 to plate 818 of tube 780. The movable switch arm 814 is operated by relay coil 820, connected in the plate circuit of rectifier tube 822, between said plate 824 and main supply line 766. Cathode 826 of the same tube is directly connected to the other supply line 768.

The grid 828 of the tube 780 is connected through resistor 830 to line 782 and directly to plate 832 of the regulator tube 834. Grid 836 of this tube is connected to cathode 838 of the same tube and to one electrode 840 of a gas regulator tube 842, the second electrode 844 of which is directly connected to line 788. A potential divider formed of three resistances 846, 848, and 850 in series is connected across lines 782 and 788. Screen grid 852 is connected directly to adjustable tap 854 which moves over resistor 804, and control grid 856 of the regulator tube in like manner is connected to variable tap 858 of resistor 848. The last secondary winding 860, associated with primary 772, supplies leads 862 and 864 with current for a number of heaters for tubes such as, for example, 834, 98 and 86.

In the operation of the voltage regulator, any minute variation in the output voltage on line 782 will vary the potential applied to grid 856 of the regulator tube, and therefore the grid cathode potential, since the gas tube 842 is an inherent regulator and tends to keep the cathode voltage constant on tube 834. Amplification by 834 of this variation affects grid 828 of tube 780 in such a way as to produce a change in the voltage drop in this tube which will be in the opposite sense to the voltage change in the line to balance the same, and line voltage will tend to remain constant. The set value of voltage may be regulated by moving the variable tap 858 over resistor 848. The screen voltage control 854—804 removes much of the ripple voltage caused by the half wave rectifier and a high degree of filtering action is obtained from this system due to the fact that the independence of the load from the output voltage causes the output voltage to act as though it had very low internal impedance. This prevents coupling or variation of output voltage between the three units supplied by this power.

The regulator tube 834 is of the indirectly heated cathode type and, therefore, takes some time to warm up before any regulating action takes place. A time delay system is therefore incorporated to prevent the application of full voltage to the tube before its cathode has reached operating temperature. Until the plate circuit of tube 780 is closed the regulating system cannot function. This in turn is accomplished by conductivity of tube 822. This tube has its cathode 860 heated by energy from secondary 862 inductively associated with primary 774. In series with the cathode and secondary, however, there is a resistance 864 which cuts down the current and thus requires a longer time period for the cathode 860 to heat. When the main switch is closed, there is some 30 seconds delay before the cathode 860 is heated and the rectifier 822 conducts. As soon as it does, of course, the relay coil 820 is energized to close switch 812—814 and the regulating system may now function normally.

The remainder of the equipment on this panel is provided to give the negative regulated voltage which it is desired to apply to line 866. Secondary 868 inductively associated with primary 774 is, therefore, connected to the two plates of full wave rectifier tube 870, the center tap of this secondary being connected directly to power line 866. A third secondary coil 872 associated with primary 774 is connected directly to the cathode of the tube 870. A filter system 874, comprising a series of chokes, condensers and resistors, is connected between the cathode and power line 866 and across this filter is a gas discharge voltage regulator tube 876, one terminal 878 of which is connected to ground and the other 880 to line 866. Thus, line 866 is provided with filtered and regulated potential below ground or negative.

To summarize the operation of the analyzer, the operator first plugs the power supply cord into the commercial 110 volt supply outlet and places the pick-up unit 2 on the lower electrode of the welder and close main switch 604. This energizes the regulated D. C. power supply panel, which provides D. C. of the proper voltage to the oscillator-detector, current amplifier and electronic switch and also the D. C. power supply panel for unregulated power for the remainder of the system. Assuming that the various adjustments for voltage, signal strength, etc., have been made, the operator then determines whether he desires to view one cycle at a time initiated by manual knob button pressure or whether to view a series of cycles initiated automatically by the welding machine timer. Beam control switch 568 is then moved to the automatic position or in engagement with the contact 570 if the beam is to be automatically controlled. Then, assuming that the operator wishes to examine one cycle at a time, he moves switch 676 to the manual position or in contact with contact 678 and switch 298 to contact 302. Then each time the manual push button switch 694 is pressed, a single welding cycle is shown on the cathode-ray tube screen. If the operator wishes to view a series of cycles, he may move switch 676 to the automatic position and the welding timer will trigger the system to impress a cycle on the tube as often as the machine operates. If the current and pressure curves are confusingly superimposed, the operator may reverse the phase of the current curve to position it on the bottom of the screen, as shown in dotted lines on Fig. 1a, by throwing switch 146 to engage contact 154.

I claim:

1. In indicating means for determining the different varying factors in the normal operation of a complex machine throughout its cycle of operation, means for translating operating factors into proportionate electrical voltages, a resonant tuned circuit connected to a part of the output of the translating means, an oscillator, a detector unit, coupling means connected between the oscillator and the detector, a low impedance transmission line inductively coupled between the tuned resonant circuit and the coupling means to introduce variations into the latter as the machine factor changes, and a cathode ray tube connected to the output of the detector to indicate such changes.

2. In indicating means for determining the different varying factors in the normal operation of a complex machine throughout its cycle of operation, means for translating operating factors into proportionate electrical voltages, a resonant tuned circuit connected to a part of the output of the translating means, an oscillator, a detector unit, coupling means connected between the oscillator and the detector, a low impedance transmission line inductively coupled between the tuned resonant circuit and the coupling means to introduce variations into the latter as the machine factor changes, amplifying means connected to the remainder of the output of the translating means, a high frequency switching means connected to both the detector means and to the amplifying means, and a cathode ray tube connected to the switching means so that the output of the translating means is applied to the plurality of factors.

3. In indicating means for determining operating factors of a mechanism in normal operation, means for translating said operating factors into proportional electrical voltages, high frequency switching means connected to the output of the translating means, a cathode ray tube, an oscillator for providing sweep frequency pulses for the tube, a plurality of push-pull amplifiers, one between the oscillator and cathode ray tube and the second between the high frequency switch and cathode ray tube, and balanced bridge circuits between each amplifier and the tube.

4. In indicating means for determining operating factors of a mechanism in normal operation, means for translating the factors into proportionate electrical voltages, a resonant tuned circuit directly connected to the translating means for one factor, oscillator-detector means inductively coupled together, a low impedance transmission line terminating in coupling units at each end inductively associated with the oscillator-detector coupling at one end and the tuned resonant circuit at the other, amplifier means connected to another translating means, high frequency electronic switching means connected to the output of both the amplifier and detector to alternately switch the two signals, and a cathode ray oscillograph connected to the output of the switch so that a plurality of high frequency pulses of a value proportionate to the factors are alternately applied to the oscillograph and a plurality of traces are formed simultaneously.

5. In indicating means for determining operating factors of a mechanism in normal operation, means for translating the factors into proportionate electrical voltages, a resonant tuned circuit directly connected to the translating means for one factor, oscillator-detector means inductively coupled together, a low impedance transmission line terminating in coupling units at each end inductively associated with the oscillator-detector coupling at one end and the tuned resonant circuit at the other, amplifier means connected to another translating means, high frequency electronic switching means connected to the output of both the amplifier and detector to alternately switch the two signals, a cathode ray oscillograph connected to the output of the switch so that a plurality of high frequency pulses of a value proportionate to the factors are alternately applied to the oscillograph and a plurality of traces are formed simultaneously, and phase inversion means associated with said amplifier to invert the phase of the signal therethrough which inverts the trace on the oscillograph tube and simplifies the studying of the same.

6. In means for indicating operating factors in the normal operation of a mechanism, means for translating a plurality of factors into proportionate electrical voltages, high frequency electronic switching means connected to the translating means, adjustable balanced amplifying means connected to the output of the electronic switching means a cathode ray oscillograph having vertical and horizontal deflection plates, oscillator means for generating a sweep pulse, adjustable amplifier means connected to said oscillator, said amplifier output being connected to the horizontal deflection plates, means interconnecting said vertical deflection plates to the output of the adjustable balanced amplifier connected to the high frequency electronic switch and beam control switching means capable of actuation either manually or by the operation of the mechanism being tested.

7. In indicating means for determining operating factors of a mechanism in normal operation, means for translating the factors into proportional electrical voltages, high frequency switching means connected to the translating means, a cathode ray tube having horizontal and vertical deflection plates, amplifying means connected between the high frequency switch and the vertical deflection plates to apply the amplified signals thereto at such a rapid rate that a multiplicity of apparently continuous traces result, sweep oscillator means, amplifier means connected to said oscillator and to the horizontal deflection plates and compound switching means for the oscillator to provide either simple sweep or continuous sweep operation either manually or machine triggered, and means for controlling the beam of the cathode ray tube, also controlled by the compound switching means.

ROBERT O. ELLERBY.

REFERENCES CITED

The following references are of record in the file of this patent:

UNITED STATES PATENTS

| Number | Name | Date |
|---|---|---|
| 2,089,430 | Roys et al. | Aug. 10, 1937 |
| 2,098,695 | Southwick | Nov. 9, 1937 |
| 2,122,499 | Stocker | July 5, 1938 |
| 2,153,140 | Diehl et al. | Apr. 4, 1939 |
| 2,221,115 | Shepard, Jr. | Nov. 12, 1940 |
| 2,350,069 | Schrader et al. | May 30, 1944 |
| 2,363,810 | Schrader et al. | Nov. 28, 1944 |
| 2,366,357 | Schlesinger | Jan. 2, 1945 |
| 2,368,449 | Cook | Jan. 30, 1945 |
| 2,405,238 | Seeley | Aug. 6, 1946 |
| 2,420,516 | Bischoff | May 13, 1947 |
| 2,427,263 | Dodds et al. | Sept. 9, 1947 |
| 2,430,237 | Moncher | Nov. 4, 1947 |
| 2,439,050 | Mallory | Apr. 6, 1948 |
| 2,449,792 | Snyder, Jr. | Sept. 21, 1948 |
| 2,466,924 | Bradford et al. | Apr. 12, 1949 |
| 2,471,530 | Lobel | May 31, 1949 |
| 2,477,770 | Richter | Aug. 2, 1949 |